United States Patent [19]

Roberts

[11] Patent Number: 5,252,521
[45] Date of Patent: Oct. 12, 1993

[54] BISMUTH-CONTAINING LEAD-FREE GLASS ENAMELS AND GLAZES OF LOW SILICA CONTENT

[75] Inventor: Gordon J. Roberts, Parma, Ohio

[73] Assignee: Ferro Corporation, Cleveland, Ohio

[21] Appl. No.: 963,410

[22] Filed: Oct. 19, 1992

[51] Int. Cl.$^5$ .................... C03C 3/066; C03C 8/04; C03C 8/14
[52] U.S. Cl. .................... 501/17; 501/79; 501/21; 501/20; 501/51
[58] Field of Search .................... 501/79, 21, 17, 20, 501/51, 76; 427/419.4, 163

[56] References Cited

U.S. PATENT DOCUMENTS

| | | | |
|---|---|---|---|
| 2,409,412 | 10/1946 | Armistead, Jr. | 201/904 |
| 3,726,698 | 4/1973 | Hares et al. | 106/54 |
| 3,743,417 | 7/1973 | Smatlak | 355/125 |
| 4,043,824 | 8/1977 | Wagar | 106/48 |
| 4,196,004 | 4/1980 | Berretz | 106/48 |
| 4,446,241 | 5/1984 | Francel et al. | 501/14 |
| 4,537,862 | 8/1985 | Francel et al. | 501/14 |
| 4,752,460 | 6/1988 | Herren | 423/593 |
| 4,822,396 | 4/1989 | Reinherz et al. | 65/60.7 |
| 4,828,596 | 5/1989 | Reinherz | 65/24 |
| 4,859,637 | 8/1989 | Roberts | 501/79 |
| 4,892,847 | 1/1990 | Reinherz | 501/14 |
| 4,902,734 | 2/1990 | Dexter et al. | 524/91 |
| 4,937,063 | 6/1990 | Sullivan | 423/593 |
| 4,959,090 | 9/1990 | Reinherz | 65/60.4 |
| 4,970,178 | 11/1990 | Klimas et al. | 501/26 |
| 4,983,196 | 1/1991 | Stotka | 65/24 |
| 4,997,687 | 3/1991 | Carter | 428/34 |
| 5,030,503 | 7/1991 | Carter et al. | 428/195 |

FOREIGN PATENT DOCUMENTS

| | | |
|---|---|---|
| 156327 | 5/1954 | Australia . |
| 238302 | 6/1960 | Australia . |
| 248836 | 6/1960 | Australia . |
| 722066 | 12/1967 | Australia . |
| 1749588 | 7/1988 | Australia . |
| 0321297 | 6/1989 | European Pat. Off. . |
| 0370683 | 5/1990 | European Pat. Off. . |
| 0444821 | 9/1991 | European Pat. Off. . |
| 2122481 | 9/1972 | France . |
| 8905781 | 6/1989 | PCT Int'l Appl. . |
| 9015782 | 12/1990 | PCT Int'l Appl. . |
| 2072159 | 9/1981 | United Kingdom . |

OTHER PUBLICATIONS

Chemical Abstracts, vol. 106, No. 6, Feb. 1987, (Columbis, Ohio), p. 289, Abstract 37474r.
Unusual Properties and Structure of Glasses in the Systems $Bi_2O_3$—$B_2O_3$—SrO; $Bi_2O_3$—$B_2O_3$—BaO; $Bi_2O_3$—ZnO and $Bi_2O_3$—PbO by V. Janakirama-Rao, Dec. 1965.

Primary Examiner—Mark L. Bell
Assistant Examiner—C. M. Bonner
Attorney, Agent, or Firm—Renner, Otto, Boisselle & Sklar

[57] ABSTRACT

This invention relates to a lead-free glass coating made by firing a lead-free glass composition comprising in weight percent from about 35% to about 77% of bismuth oxide, from about 10% to about 33% of boron oxide, and from about 10% to about 32% of zinc oxide at a temperature sufficient to fuse and cure the glass composition. The invention also relates to lead-free glazes and enamels that exhibit excellent acid resistance, possess low coefficients of linear or thermal expansion, and moderate maturation temperatures.

13 Claims, No Drawings ized appliance glass or other glass is desired, substrates should be tempered in temperatures falling into these ranges during the firing of the enamel or glaze.

BISMUTH-CONTAINING LEAD-FREE GLASS ENAMELS AND GLAZES OF LOW SILICA CONTENT

FIELD OF THE INVENTION

This invention relates to lead-free glass enamels and glazes. More particularly, this invention relates to a method of decorating or coating glass structures, such as automotive glass, glass spandrels, appliance glassware and other glass objects.

BACKGROUND OF THE INVENTION

Lead containing glazes and enamels for glass substrates are well-known in the ceramic art. A glaze is typically thought of as a clear coating material, whereas an enamel is a glaze which contains a pigment or other particles in suspension. Such glazes and enamels are generally applied to glass surfaces in the form of a paste, the paste containing finely ground particles of glassy material, commonly called "frit," and a vehicle. After application of the glaze or enamel to the glass surface by silk screening or other techniques, the glass is fired to volatilize the vehicle, fuse the frit and bond the glaze or enamel to the glass surface.

The use of lead oxide as a frit ingredient serves to lower the melting point of the frit. Recent efforts have been made at retaining the low melt temperature of these glazes and enamels but with the removal of the lead oxide.

U.S. Pat. No. 4,892,847, issued to Reinherz, relates to lead-free glass frit compositions. The compositions include from 25-35% silicon oxide, 25-45% of bismuth oxide, 10-25% boron oxide, 4-19% alkali metal oxide, and 0.3-8% of $ZrO_2/TiO_2$. Reinherz teaches that coatings which significantly exceed the 45 weight percent bismuth oxide concentration exhibit neither excellent color stability when blended with certain pigments in a glaze or enamel nor resistance to scratching.

European Patent Application 370,683, naming Murkens et al. as inventors, relates to a glass flux composition consisting essentially by weight of 45-65% bismuth oxide, 25-36% silicon oxide, 4-6% boron oxide, 3-6% titanium oxide, 1-3% sodium oxide, 0.5-2% potassium oxide, 2-6% lithium oxide, 0-3% aluminum oxide, 0-1% zirconium (IV) oxide, 0-1% barium oxide, 0-1% calcium oxide, 0-1% magnesium oxide, 0-1% zinc oxide, 0-3% lead oxide, and 0-0.5% cadmium oxide.

The article "Unusual Properties and Structure of Glasses in the System $Bi_2O_3$—$B_2O_3$—SrO; $Bi_2O_3$—$B_2O_3$—BaO; $Bi_2O_3$—$B_2O_3$—ZnO; and $Bi_2O_3$—$B_2O_3$—PbO", by Janakirama-Rao, describes various curious bismuth borate-based glasses. $Bi_2O_3$—ZnO—$B_2O_3$ glass compositions are described and illustrated in FIG. 1 of this article.

SUMMARY OF THE INVENTION

This invention relates to a lead-free glass-coating made by firing a lead-free glass composition comprising in weight percent from about 35% to about 77% of bismuth oxide ($Bi_2O_3$), from about 10% to about 33% of boron oxide, less than about 10% silicon dioxide ($SiO_2$) and from about 10% to about 32% of zinc oxide (ZnO) at a temperature sufficient to fuse the glass composition.

This invention also relates to a lead-free glass composition comprising from about 35% to about 77% by weight bismuth oxide, from about 10% to about 33% by weight boron oxide, from about 10% to about 32% by weight zinc oxide, and from about 0.5% to about 9% silicon oxide. The compositions may also contain from about 1% to about 15% of zirconium oxide ($ZrO_2$).

Another aspect of the invention relates to a lead-free glass-coating made by firing the composition described herein at a temperature of from about 925° F. to about 1300° F. until said composition is fused.

The invention further concerns a method of decorating glass used in appliances or other glass objects comprising coating said glass with the composition described above, and firing said composition at a temperature of from about 1000° F. to about 1200° F. until said composition is fused.

These lead-free glass frits exhibit unexpectedly excellent acid resistance, possess low coefficients of linear thermal expansion, and maturation temperatures that make them suitable for glass enamels and glazes.

Glass enamels and glazes made in accordance with the present invention find commercial utility in such applications as coatings for automotive glass, appliance glass, architectural spandrels, beverage containers, lighting bulbs and fixtures and other glass objects.

The foregoing and other features of the invention are hereinafter more fully described and particularly pointed out in the claims. The following description sets forth in detail certain illustrative embodiments of the invention, those being indicative, however, of but a few of the various ways in which the principles of the invention may be employed.

DETAILED DESCRIPTION OF THE PREFERRED EMBODIMENTS

This invention relates to a lead-free glass frit possessing not only a moderately low coefficient of thermal expansion but also possessing an excellent resistance to acid environments. Furthermore, the maturation temperature for the glass systems herein described is moderate and much lower than prior art bismuth containing enamels that include much higher silica ($SiO_2$) levels. Such glasses find utility as glazes or enamels for systems requiring excellent chemical and thermal stability. Examples of such applications include glazes or enamels for glass panels used in automobiles, appliances and architectural spandrels.

This invention also provides for a method of decorating glass substrates by the application of a glass enamel made according to this invention to a glass substrate and subsequent firing resulting in a lead-free glass coating.

The glass enamel or glaze made in accordance with the present invention contains less than about 1% by weight lead oxide (PbO), preferably less than about 0.75% by weight lead oxide and more preferably less than about 0.5% by weight lead oxide. Even further preferred, the glass enamel or glaze contains less than about 0.05% by weight lead oxide. As used in this specification and the claims below the term "lead-free" means no intentional addition of lead or lead oxide and less than 0.5% by weight lead oxide.

For use in conjunction with glass substrates, the glaze or enamel of the present invention preferably matures and is compatible with a relatively fast fire of approximately 925° F. to about 1300° F., preferably from about 950° F. to about 1250° F., and more preferably from about 975° F. to about 1200° F. for a relatively brief period, that is from about 1 to about 20 minutes, preferably from about 2 to about 15 minutes, and more preferably from about 3 to about 7 minutes. Unless otherwise indicated, temperatures referred to herein are firing temperatures, that is to say the temperature of the oven.

A glass frit made in accordance with the principles of the present invention can be melted in sintered fused silica crucibles at 1830° F. to about 2010° F. with little attack on the crucible, though melting time must be controlled somewhat closely because of silica pickup and will vary according to the size of the batch. A preferred time for a 500 gm batch may be about 25 to about 30 minutes, while a preferred time for 1 kg batch of the same composition may be about 45 to about 55 minutes. The melt may be handled by any suitable means though typically it is quenched by steel rolls into flake or frit, using techniques well-known to those skilled in the art.

This invention relates to a lead-free glass enamel or glaze comprising a glass frit including the following components:

| Component | Preferred Range (Wt. %) | More Preferred Range (Wt. %) |
|---|---|---|
| $Bi_2O_3$ | 35–77 | 39–74 |
| $B_2O_3$ | 10–33 | 12–31 |
| ZnO | 10–32 | 15–30 |
| $ZrO_2$ | 0–10 | 0–8 |
| $SiO_2$ | 0–9 | 0–5 |
| $K_2O$ | 0–6 | 0–4 |
| BaO | 0–15 | 0–12 |
| $Al_2O_3$ | 0–4 | 0–2 |
| $Sb_2O_5$ | 0–15 | 0–10 |
| $P_2O_5$ | 0–7 | 0–5 |
| $CeO_2$ | 0–15 | 0–12 |
| SrO | 0–9 | 0–7 |
| $V_2O_5$ | 0–9 | 0–7 |

In another embodiment, bismuth oxide is present in an amount by weight from about 45–60%, zinc oxide is present in an amount from about 17–25%, and boron oxide is present in an amount of from about 14–20% of the glass frit composition. More preferably, the glass frit composition comprises from about 47 weight percent to about 57 weight percent bismuth oxide.

The glass enamels are made according to the following technique. Glass frits, in flake or granular form, are ball-milled to an average particle size of about 3 to about 4 microns as measured on a Microtrac at the 50% level, with either a water or a water and an alcohol solution (e.g., 50% water and 50% isopropyl alcohol), dried, and blended with inorganic filler, pigments, other materials and a screen printing vehicle (e.g., a glycol ether acetate-based system). The resulting ink composition is screen-printed on glass substrates by methods known in the art, dried and then fired.

It will be appreciated that the present invention contemplates the use of various vehicles, the particular vehicle generally being a function of the particular application technique employed. Such vehicles include, for example, UV curable vehicles, water miscible vehicles, thermoplastic vehicles, hot melt vehicles, spray vehicles and roll coat vehicles.

Pigments, other glass frits, fillers and other additives may be included in the glass enamel The glass enamel comprises by weight from about 30% to about 90% glass frit as set forth above, from about 3% to about 40% vehicle and up to about 40% pigment and other glass frits and fillers. Preferably, the glass enamel comprises by weight from about 35% to about 85% glass frit as set forth above, from about 4% to about 35% vehicle and up to about 35% pigment and other glass frits and fillers. More preferably, the glass enamel comprises by weight from about 40% to about 80% glass frit as set forth above, from about 5% to about 35% vehicle and up to about 30% pigment and other glass frits and fillers.

An enamel finish produced in accordance with the principles of the present invention exhibits good acid resistance. Specifically, utilizing the procedures set forth in ASTM test procedure C724-88, the enamel finish exhibits better than a Grade 7 degree of attack (i.e., complete removal of enamel in exposed area) Preferably, the enamel finish displays at least a Grade 6 degree of attack (i.e., significant removal of enamel with pin holing) pursuant to ASTM test procedure C724-88 and more preferably at least a Grade 5 degree of attack (i.e., surface dull or matte with chalking possible). Most preferably, the enamel finish displays at least a Grade 4 degree of attack (i.e., a definite stain with a gross color change or strongly iridescent surface visible at angles less than 30° and which may blur reflected images).

Utilizing the grading procedures set forth in ASTM test procedure C724-88, but immersing the glass enamel in a 4% acetic acid solution for a period of one minute, the enamel finish exhibits at least a Grade 5 degree of attack (i.e., surface dull or matte with chalking possible). Preferably, the enamel finish utilizing the 4% acetic acid solution and a one minute immersion displays at least a Grade 4 degree of attack (i.e., definite stain with a gross color change or strongly iridescent surface visible at angles less than 30° and which may blur reflected images). More preferably, the enamel finish utilizing the 4% acetic acid solution and a one minute immersion displays at least a Grade 3 degree of attack (i.e., a definite stain which does not blur reflected images and is visible at angles less than 30°).

By way of illustration and not by any limitation, the following example will describe specific enamel compositions within the scope of the present invention. Unless otherwise indicated, all parts and percentages are by weight, and all temperatures are firing temperatures, that is to say oven temperatures, in degrees Fahrenheit.

EXAMPLE 1

Glass enamel compositions indicated below in Table I as Formulations A, B and C are prepared by ball milling the indicated materials in an alcohol solution until a particle size of about 3 microns to about 4 microns, as determined by a Microtrac at a 50% level, is achieved. The particles are dried. The dried particles are blended into the screen printing vehicle, and applied to glass substrates to a thickness of about 0.5 to about 2 mils, and then fired at the indicated temperatures for a period of 4 minutes.

TABLE I

| | (Weight Percent) | | |
|---|---|---|---|
| | A | B | C |
| Frit Composition | | | |
| $Bi_2O_3$ | 72.57 | 60.68 | 55.16 |
| ZnO | 14.78 | 21.19 | 19.27 |
| $B_2O_3$ | 12.65 | 18.13 | 16.48 |
| $ZrO_2$ | — | — | 6.09 |
| $SiO_2$ | — | — | 3.0 |
| Enamel Composition | | | |
| Frit | 66.0 | 66.0 | 66.0 |
| $Pigment_1$ | 16.2 | 16.2 | 16.2 |
| $Vehicle_2$ | 17.8 | 17.8 | 17.8 |

TABLE I-continued

| | (Weight Percent) | | |
|---|---|---|---|
| | A | B | C |
| Firing Temperature | 1000° F. | 1050° F. | 1050° F. |

[1] K-393-2 CuCrMn pigment available from Ferro Corporation of Cleveland, Ohio.
[2] C-67 vehicle available from Ferro Corporation.

Although the invention has been shown and described with respect to preferred embodiments, it is obvious that equivalent alterations and modifications will occur to others skilled in the art upon reading and understanding the specification. The present invention includes all such equivalent alterations and modifications, and is limited only by the scope of the following claims.

I claim:

1. A glass-coating composition made by firing a glass enamel or glaze including a glass frit comprising in weight percent from about 35% to about 77% of bismuth oxide, from about 10% to about 33% of boron oxide, from about 10% to about 32% of zinc oxide and less than about 0.75% PbO at a temperature sufficient to fuse and cure the glass composition.

2. The coating of claim 1 wherein the firing occurs at a temperature of from about 925° F. to about 1300° F.

3. The coating of claim 1 wherein said glass frit further comprises from about 0.5% to about 9% silica and from about 1% to about 15% of zirconium oxide.

4. A lead-free glass composition comprising:
from about 35% to about 77% by weight bismuth oxide, from about 10% to about 33% by weight boron oxide, from about 10% to about 32% by weight zinc oxide, and up to about 9% by weight silica.

5. The composition of claim 4 further comprising from about 1% to about 15% by weight of zirconium oxide.

6. A lead-free glass coating composition made by firing the composition of claim 4 at a temperature of from about 925° F. to about 1300° F. until said composition is fused and cured.

7. A lead-free glass enamel composition comprising from about 3% to about 40% by weight vehicle, up to about 40% by weight pigment and fillers, and from about 30% to about 90% by weight of the composition of claim 4.

8. A lead-free enamel composition comprising from about 4% to about 35% by weight vehicle, up to about 35% by weight pigment and fillers, and from about 35% to about 85% by weight of the composition of claim 4.

9. A lead-free glass composition consisting essentially of from about 35% to about 77% by weight bismuth oxide, from about 10% to about 33% by weight boron oxide, from about 10% to about 32% by weight zinc oxide, from about 0.5% to about 9% by weight silicon oxide, from about 1% to about 15% by weight of zirconium oxide, up to about 4% by weight of aluminum oxide, up to about 15% by weight of cerium oxide, up to about 7% by weight of strontium oxide, up to about 12% by weight of barium oxide, and up to about 15% by weight of antimony(III) oxide.

10. The lead-free glass composition of claim 4 comprising in weight percent from about 39% to about 74% $Bi_2O_3$, from about 12% to about 31% $B_2O_3$ and from about 15% to about 30% ZnO, up to about 10% $ZrO_2$ and up to 5% $SiO_2$.

11. The lead-free glass composition of claim 4 comprising in weight percent from about 45% to about 60% $Bi_2O_3$, from about 14% to about 20% $B_2O_3$, from about 17% to about 25% ZnO and up to about 9% $SiO_2$.

12. The lead-free glass composition of claim 4 including up to about 9% by weight $V_2O_5$.

13. The lead-free glass composition of claim 4 including up to about 7% by weight $P_2O_5$.

* * * * *